March 3, 1931.  W. VAN GUILDER  1,794,475
SHOCK ABSORBER
Filed Jan. 16, 1928   2 Sheets-Sheet 1
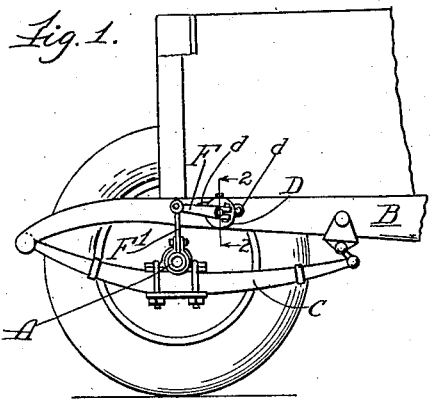
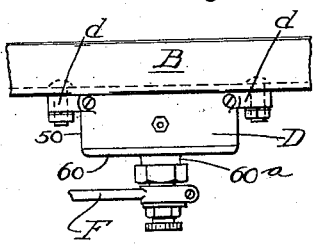
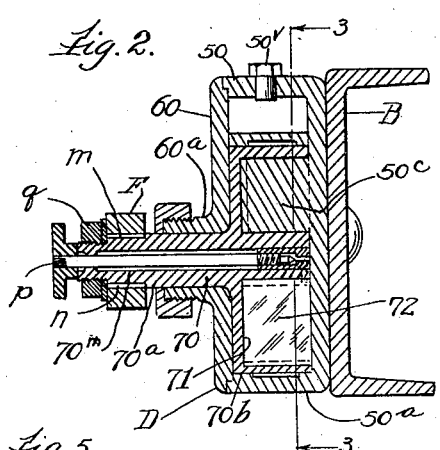
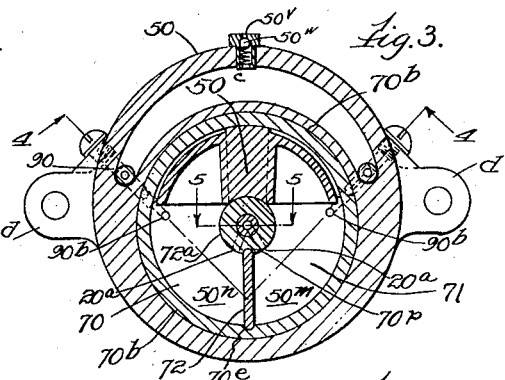
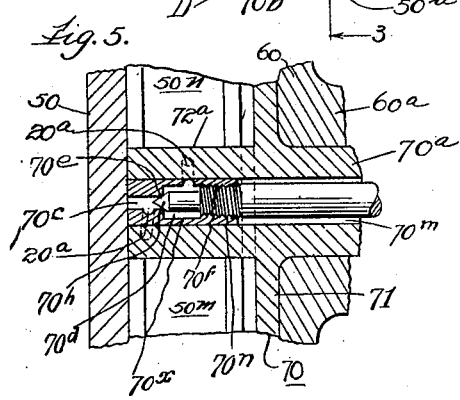
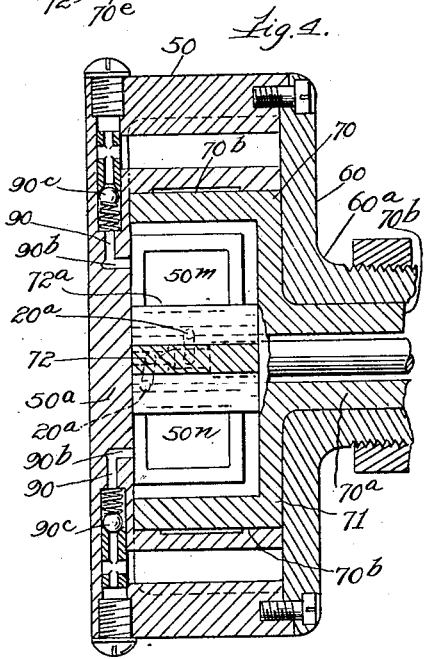
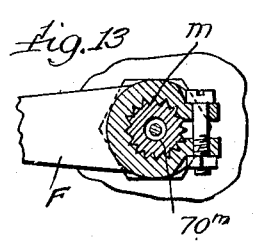
Inventor.
Walter Van Guilder.
by Burton & Burton
his Attorneys.

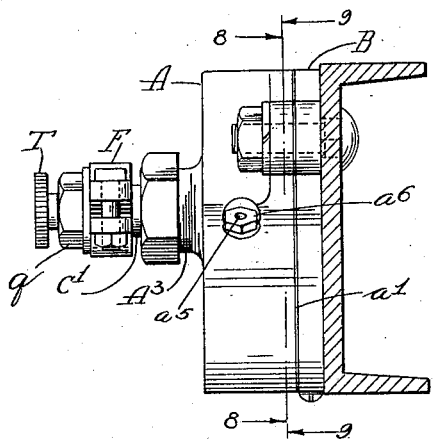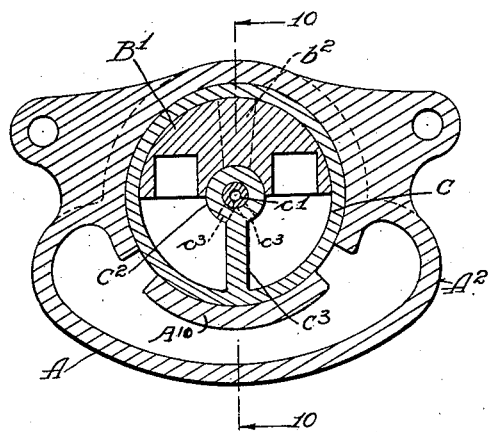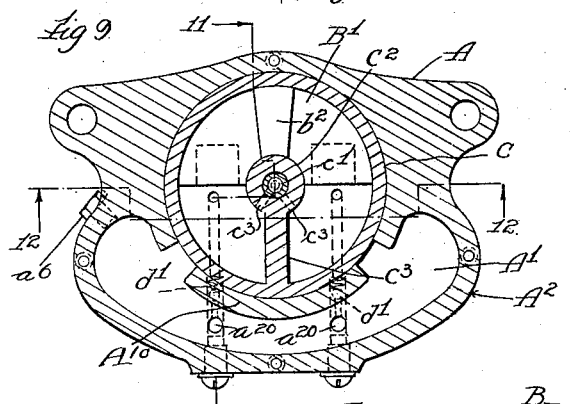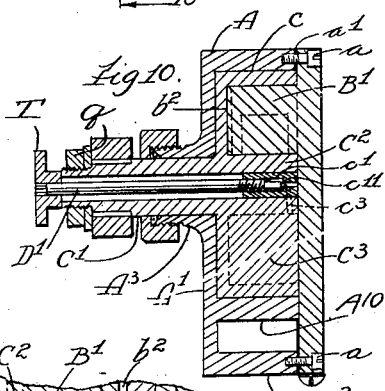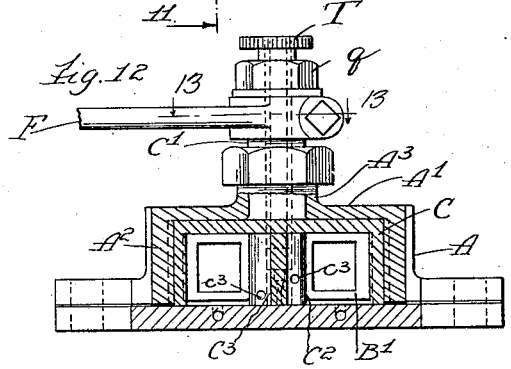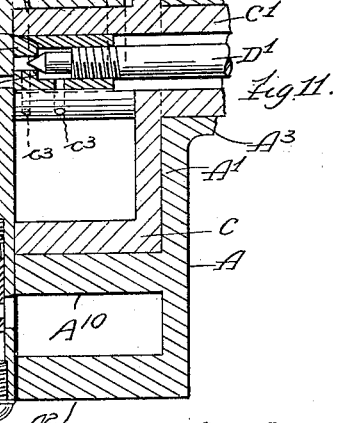

Patented Mar. 3, 1931

1,794,475

UNITED STATES PATENT OFFICE

WALTER VAN GUILDER, OF CHICAGO, ILLINOIS, ASSIGNOR TO STEWART-WARNER CORPORATION, OF CHICAGO, ILLINOIS, A CORPORATION OF VIRGINIA

SHOCK ABSORBER

Application filed January 16, 1928. Serial No. 247,042.

The purpose of this invention is to provide an improved construction of the general character of a shock absorber or rebound check for spring vehicles of the type commonly termed "hydraulic" in which the relative movement of the spring-supported vehicle body and the chassis or wheel-supported frame operates for forcing a liquid from one chamber into another and is checked by the restricted character of the communication between the two chambers, the present invention being directed to utilizing the pressure of a liquid due to the restricted character of the communication for producing friction between the co-operating parts to supplement the retardment due directly to the restricted character of the communication between the two chambers. It consists in the elements and features of construction shown and described as indicated in the claims.

In the drawings:—

Figure 1 is a diagrammatic view in the nature of a side elevation of the portions of a vehicle connected by a shock absorbing device embodying this invention, the latter being shown in side elevation.

Figure 2 is a section at the line 2—2 on Figure 1, being at the pivotal axis of two parts which derive relative angular movement in the descent and rebound of the vehicle body.

Figure 3 is a section at the line 3—3 on Figure 2.

Figure 4 is a detail section upon an enlarged scale at the line 4—4 on Figure 3.

Figure 5 is a section at the line 5—5 on Figure 3.

Figure 6 is a top plan view of the structure shown in Figure 2.

Figure 7 is an edge elevation of a modified embodiment of the invention.

Figures 8 and 9 are sections at the line 8—8 and 9—9 looking in opposite directions on Figure 7.

Figure 10 is a section at the line 10—10 on Figure 8.

Figure 11 is a section at the line 11—11 on Figure 9.

Figure 12 is a section at the line 12—12 on Figure 9.

Figure 13 is a section at the line 13—13 on Figure 12.

In the drawings, A represents an axle of the vehicle equipped with a device embodying this invention. B represents a side bar of the vehicle frame structure which is carried upon the axle by the vehicle springs, one of which is indicated at C. D represents in totality an element of the construction which embodies the invention herein claimed, comprising a casing in which there is pivoted one end of a lever member, F, the other end of which is pivotally connected with the axle as by an upstanding link, F¹, the pivotal movement of the lever member, F, in the casing, occurring as will be readily understood in the up and down movement with respect to the axle of the vehicle frame member, A, on which the casing, D, is mounted by bolts through lugs, d, d, of the casing. The construction and detail of this casing and its associate elements will now be described.

The casing comprises a cup-formed member, 50, and a cover or closure member, 60. The cover member, 60, has a centrally projecting boss, 60ª, which constitutes a journal bearing for the stem, 70ª, of a rotor, 70, which is enclosed in the casing, said rotor being in cup form comprising a disk, 71, which seats flat against the inner face of the cover member, 60, a stem, 70ª, constitutes the pivot of the lever, F, and which is journalled, as stated, in the journal bearing, 60ª, of the cover member, and a peripheral flange, 70ᵇ, which completes the cup form of the rotor, said flange being dimensioned for fitting snugly in the casing member, 50, when the cover member, 60, is applied thereto; that is to say, the disk, 71, seating upon the inner side of the cover with the edge of the flange, 70ᵇ, seated upon the bottom web, 50ª, of the casing. The casing member, 50, has projecting from its bottom web within the cavity of the cup-shaped rotor, a boss, 50ᶜ, which is in general in the form of a cylindrical segment having its outer curvilinear surface convex about the axis of the rotor flange, 70ᵇ, and seating upon the inner concave surface of said flange. The rotor has a rigid rib or blade, 72, extending from its disk, 71, radial with respect to the flange, 70ᵇ, and comprising at the center of the cup form of the rotor a portion 72ᵃ which is substantially in the form of a continuation of the stem, 70ᵃ, being cylindrical of substantially the diameter of said stem, and seating liquid-tight upon the inner side of the boss, 50ᶜ, of the casing.

Upon considering the structure thus far described, it will be recognized that the rotor has a cavity which is a portion of the total cavity of the casing, and which is partitioned from the remainder of the casing cavity by the flange, 70ᵇ, of the rotor; and it will also be seen that this rotor cavity is itself partitioned by the radial rib or blade, 72, in view of the seating of what may be called the hub or center portion 72ᵃ of this blade, on the inner side of the boss, 50ᶜ, of the casing, which boss intruding into the rotor cavity reduces the capacity of said cavity to a certain extent. Upon considering this construction further it will be seen that if both the chambers, 50ᵐ and 50ⁿ, of the rotor cavity which are partitioned as described by the rib or blade, 72, are filled with liquid, the oscillation of the rotor in the casing would be impossible without provision for shifting the liquid from one of the two chambers into the other, according to the direction of the oscillatory movement; and that if provision is made for such shifting of the liquid, the pressure necessary to be applied for oscillating the rotor will depend upon the freedom of flow of the liquid from one chamber to the other; and that the liquid pressure developed by force applied to oscillate the rotor will operate for stressing the disk, 71, of the rotor against the inner face of the cover member, 60, and that such action will be due to the fact that the rotor cavity is open toward the opposite wall, 50ᵃ, of the casing. Consideration of these characteristics which will make evident the reasons for the detail construction will now be described.

To provide for liquid flow between the two chambers of the rotor which are partitioned from each other by the rib, 72, and at the same time to make it possible to regulate the flow capacity of such communication, ducts, 20ᵃ, 20ᵃ, are formed extending in radially from opposite sides of the rib, 72, in the central hub, 72ᵃ, and bushing hereinafter mentioned at points separated a short distance along the axis, and the stem, 70ᵃ, is axially bored as seen at 70ᵐ, and provided with a drive-fitted bushing, 70ˣ, having a lesser bore, 70ᶜ, and counterbored as seen at 70ᵈ, forming a valve seat, 70ᵉ, intermediate the ports of the ducts, 20ᵃ, 20ᵃ, and threaded as seen at 70ᶠ for receiving the valve member, 70ᵍ, which consists of a stem threaded as seen at 70ⁿ, for engaging said thread of the bushing and reduced beyond the thread and terminating tapered, constituting a needle valve as seen at 70ʰ for seating in the seat, 70ᵉ, and adjustable to graduate the access of liquid through the ducts, 20ᵃ, 20ᵃ, for restricting more or less the flow between the two piston chambers, or closing the passage entirely when desired.

Also as a matter of convenience of construction and assembly, the radial rib, 72, is desirably formed comprising a separate piece and drive-fitted into grooves, 70ᵉ and 70ᵖ, formed respectively in the flange, 70ᵇ, and in what is hereinabove referred to as the hub, 72ᵃ.

For maintaining the partitioned chambers of the rotor full of liquid, as is necessary in order to ensure the action in accordance with the restriction of the flow through the passages, 20ᵃ, the cavity of the casing exceeds the cavity of the rotor to the extent of the crescent-shaped portion outside the rotor which it will be noticed is journalled eccentrically with respect to the outline of the casing; and in order that the liquid supply which may be maintained in this excess cavity may be automatically furnished to the chambers of the rotor to supply any deficiency therein due either to changes in temperature or minor leakages, ducts, 90, 90, are formed in the bottom web, 50ᵃ, of the casing, leading from said excess cavity and opening from said bottom web in the rotor chambers, respectively, as seen at 90ᵇ, and in each of said ducts there is provided a check valve, 90ᶜ, opening for flow toward the rotor chamber and seating against reverse flow. The operation of this feature of the construction it will be understood is that whenever there is deficiency of liquid in the rotor chambers, the oscillatory movement of the rotor for forcing the liquid from one of its chambers into the other will initially reduce the chamber from which the liquid is to be thus forced so that it will be completely filled with liquid, although the latter is deficient for completely filling both chambers; and accordingly there will tend to result a partial vacuum in the other chamber, which will be prevented by the flow of the liquid from the excess cavity of the casing past the check valve which opens in the direction for such flow; and thus at every stroke of the rotor, any deficiency of liquid in the rotor chambers for completely filling the same will be supplied from the excess cavity of the casing. In order that this action may occur, it is necessary that said excess cavity of the casing should be accessible to atmospheric pressure when the movement of the rotor would tend to draw the liquid from it into the rotor chamber; and this is provided for by an atmosphere vent shown at 50ᵛ, which is controlled by a check valve, 50ʷ, opening inwardly and preventing outflow of the liquid from the excess cavity.

The construction shown in Figures 7 to 11 differs from that shown in the earlier figures above described primarily and chiefly in that the element cooperating with the hub of the rotor whose rib or blade operates piston-wise between the two chambers is formed rigid with the cover member of the casing instead of with the body member, that is,—the member which comprises the enclosing flanged wall of the casing. A second feature of difference between the two forms consists that in the form shown in the later figures, the rotor stem is journalled in the body member instead of in the cover member as in the earlier figures. The construction of Figures 7 to 11 will now be described in detail. It comprises a body member, A, and a cover member, B, the body member being in cup-form having a flat bottom web, $A^1$, a flange wall, $A^2$, and having an axially extending boss, A, projecting from the outer side of the web, $A^1$, to afford journal bearing for the stem, $C^1$, of the rotor, C. The cover member, B, is a flat disk fitted for closing the open side of the cup-form of the body member, A, and adapted to be secured thereto, as indicated, by screws, $a$, with interposed packing indicated at $a^1$. The rotor, C, is a cylindrical cup-shaped element having an axially protruding stem, $C^1$, which is journaled in the axially protruding boss, $A^{10}$, of the casing body member, A. This rotor cup is dimensioned axially for spanning the axial space between the bottom web, $A^1$, of the body member and the inner surface of the cover member, B, the bottom web of said rotor cup being seated on said web of the body member and the edge of the cylindrical flange seating on the inner surface of the cover member. From the inner surface of said cover member an arcuate boss, $B^1$, projects within the cylindrical flange of the rotor, said boss having its convex surface curved about the rotor axis with a radius equal to the inner radius of the rotor flange, so that the convex surface of the arcuate boss fits liquid-tight within the cylindrical flange of the rotor, and the boss is formed with a relatively narrow upraise of rib, $b^2$, at the middle part, the entire height of the boss at the location of the rib being such as to fit liquid-tight between the bottom web of the rotor and the opposite web of the body, thus limiting the frictioning surface to the area of the upraise. This boss, $B^1$, is extended toward the center of the rotor cup, and the hub, $C^2$, of the rotor seats liquid-tight at the inner side of said arcuate boss, the rotor having a radial rib or blade, $C^3$, extending from the hub to the cylindrical flange of the rotor partitioning the cavity of the rotor into two chambers which are alternately increased and reduced by the oscillation of the rotor carrying said radial rib alternately in one direction or the other toward the inwardly facing side of the arcuate boss, $B^1$. Restricted communication for liquid flow between the two chambers of the rotor which are partitioned by the rib or blade, $C^3$, is afforded by ducts, $c^3, c^3$, bored radially of the hub, $C^2$, intersecting an axial bore, $c^1$, in the rotor stem, said axial bore, $c^1$, being counter-bored to form a valve seat, $c^{11}$, intermediate in the length of the stem between the ducts, $c^3, c^3$, and a valve, D, having its stem, $D^1$, provided with a threaded boss screwed into the counterbore which is interiorly threaded for receiving it to seat the valve head on said valve seat, $c^{11}$, and to adjust the valve to regulate the flow capacity of the passage through said ports, $c^3, c^3$, and across the axial bore, $c^1$, from one chamber to the other.

The casing cavity exceeds the dimensions of the rotor affording outside the rotor and partitioned from the cavity of the latter by its flange, a chamber, for containing reserve liquid to supply any deficiency of liquid for filling both the chambers of the rotor which may arise by reason of any minor leakage or contraction of the liquid by reason of change of temperature or other cause; and for rendering the surplus contained in the reservoir available for this purpose, ducts, $a^{20}$, $a^{20}$, are formed in the cover member both opening at one end in the chamber, and at the other end in the cavity of the rotor at opposite sides of the range of movement of the rib or blade, $C^3$; and in each of said ducts there is provided a check valve, $d^1$, opening for flow from the reserve chamber, to the rotor cavity and seating against reverse flow. In order to permit the flow of the liquid from the reserve chamber, to the rotor chambers, respectively, under the circumstances indicated, the reserve chamber is provided with an atmosphere vent indicated at $a^5$, which is controlled by a check valve, $a^6$, opening inwardly thereof and seating to prevent discharge of liquid from the reserve chamber.

The operation of this form will be understood as being substantially the same as that of the form shown in the earlier figures, that is to say, the rotor stem being connected for oscillation of the rotor by the up and down movement of the vehicle, which movement is checked by the resistance to the flow of the liquid from one rotor chamber to the other through the restricted communication between said chambers as described.

In both the forms illustrated, the stem of the rotor which forms the pivot of the lever, F, in the casing, is arranged to engage said stem securely by co-operating serrations, $m$, $n$, on the stem and in the wall of the aperture in the lever at which it is applied to the stem, and the end of the stem outside said serrations is reduced and threaded as seen at $p$ for a nut, $q$, which retains the lever and stem in engagement at the cutting serrations. The valve member in both forms is provided with a knurled operating handle, T, as seen in the corresponding figures of the drawings.

I claim:

1. A device for the purpose indicated comprising in combination a two-membered casing, one member having a cavity open at one side of said member, the other member being adapted to be applied to the first member and close the cavity thereof, one of said members having a journal bearing for a rotor; a rotor having a stem journalled in said bearing and exteriorly accessible for actuation, said rotor comprising a disk seating on the inner surface of one of said casing members and having a cylindrical flange seating on the inner surface of the other casing member; whereby it partitions the rotor cavity from the remainder of the casing cavity; the casing comprising a part having a seating area at the inner side of the rotor flange convexly surfaced for liquid-tight seating on the inner surface of the rotor flange, the rotor having a rib extending from the disk substantially radial with respect to its cylindrical flange within the latter surfaced concentrically with respect thereto and seating liquid-tight on the inner surface of the last mentioned convexly surfaced part of the casing; whereby said rib partitions the rotor cavity into two chambers, the structure having a restricted flow passage between said two chambers.

2. In the construction defined in claim 1, the flow passage between the rotor chambers being located for traversing the zone of the rotor stem, and a valve extending through said stem for controlling said passage.

3. In the construction defined in claim 1, the flow passage comprising ducts leading from opposite sides of the rib radially with respect to the rotor stem, said stem having an axial duct to which both said radial ducts lead and having a valve seat intermediate the opening of the radial ducts, and a valve controlling the port through said seat and having its stem extending out through the rotor stem for exterior manual operation of the valve for regulating the freedom of flow between the two rotor chambers.

4. In the construction defined in claim 1, the casing part which extends within the rotor cavity having non-communicating recesses at the inner side open toward the two chambers respectively into which the rotor cavity is partitioned by said rib, whereby the action for forcing the liquid content from one chamber to the other of the rotor in the oscillation of the latter is cushioned by the air trapped in said recesses.

5. In the construction defined in claim 1, the casing wall at the open side of the rotor having ducts leading for discharge respectively into the two chambers into which the rotor cavity is partitioned by its rib, and check valves in said ducts opening for flow toward said respective chambers and seating against reverse flow; whereby any deficiency of liquid in the rotor cavity for maintaining said chambers filled in the oscillation of the rotor is supplied from the casing cavity in excess of the rotor cavity.

6. A device for the purpose indicated comprising a casing having a closed cavity adapted to be filled with liquid; a rotor in said casing having a cavity communicating with and constituting part of the cavity of the casing and open toward one inner side wall of the casing, the opposite side of the rotor being seated on the opposite inner side wall of the casing, the rotor being free to be pressed toward said last mentioned wall upon pressure within the rotor cavity communicated to the casing cavity through the first mentioned open side of the rotor, the rotor having a stem accessible exteriorly of the casing for oscillating the rotor in the casing, and comprising also a part which partitions the cavity-in-common of the rotor and the casing and which is moved in the oscillation of the rotor for alternately enlarging and reducing the capacity of the two parts of said cavity-in-common which it partitions from each other, the structure comprising a passage restricted for liquid flow between the partitioned parts; whereby upon actuation of the rotor for shifting said partitioning member and forcing liquid from one side to the other thereof, the pressure developed in the space from which the liquid is being forced by reason of the restriction of the flow operates for friction between the rotor and the casing wall against which it is seated.

7. In the construction defined in claim 6, the restricted flow passage being formed extended, intersecting a line longitudinal with respect to the rotor-operating stem, and a valve set in through said stem and exteriorly operated for controlling said fluid passage.

8. In the construction defined in claim 6, the structure comprising recesses in the fixed limiting walls of the two cavities which are partitioned by the rotor which in the operative position of the structure open downwardly, whereby they form air traps in which the trapped air operates for cushioning the liquid-forcing action of the rotor.

9. In the construction defined in claim 6, the casing cavity comprising a space in excess of the space of the cavity common to the casing and rotor, and the structure containing flow passages from said excess casing space to the two partitioned portions of the rotor cavity, and check valves in said flow passages open for flow toward the respectively partitioned portions of said cavity and seating against reverse flow.

10. A device for the purpose indicated comprising a casing having a closed cavity adapted to be filled with liquid; a rotor mounted for oscillation in the casing cavity having a cavity which is part of the casing cavity partitioned from the remainder by the peripheral wall of the rotor, the casing and the rotor having parts rigid with them respectively which co-operate to partition the rotor cavity into two chambers adapted to be reciprocally enlarged and reduced by the oscillation of the rotor moving the partitioning part which it carries relatively to the partitioning part carried by the casing, said partitioning parts having means of restricted liquid communication between the two chambers which said parts partition from each other, and the partitioning part carried by the casing being in the upper part of the rotor cavity and having recesses in its under side for trapping air above the liquid in the rotor cavity for cushioning the action of the rotor in its oscillation for driving the liquid from one of the rotor chambers to the other through said restricted communication.

In testimony whereof, I have hereunto set my hand at Chicago, Illinois, this 12th day of January, 1928.

WALTER VAN GUILDER.